United States Patent Office 2,972,580
Patented Feb. 21, 1961

2,972,580
INHIBITION OF FOAMING OF OIL COMPOSITIONS

Leo V. Mullen, Jr., Springfield, N.J., assignor to Esso Research and Engineering Company, a corporation of Delaware No Drawing. Filed Sept. 3, 1957, Ser. No. 681,475

2 Claims. (Cl. 252—33.4)

This invention relates to foam inhibition of oil compositions. Particularly, the invention relates to the use of dimethyl silicone polymers and certain ethers of glycols and polyglycols, to inhibit foaming of additive-containing lubricating oil compositions.

The excessive foaming of lubricating oil compositions, hydraulic oils and the like, may cause operating difficulties in machinery as well as in the processing of the oils themselves. Detergent additive materials, which are desirable because they prevent sludging, deposition of gum and the like, are frequently strong foam promoters. A modern tendency to use such additive materials in large proportions, gives rise to increased difficulties with foaming. It had been proposed to use silicone polymers to inhibit foaming of such compositions, however, in many instances the silicones per se are not effective. It has now been found that the effectiveness of silicone polymers as anti-foamants in certain oil compositions can be materially increased and enhanced by the presence of a minor proportion of a glycol ether or a polyglycol ether. These combinations are much more effective than would be indicated by the mere additive effect of the silicone and the ether material alone.

In general, the heavier the oil, and the greater its content of additive, the greater will be its tendency to foam and the more difficult to inhibit its foaming. Additives such as the oil-soluble sulfonates; the salts of alkylated aromatic compounds such as: alkyl phenols, alkyl phenol sulfides, and the phosphorus sulfide treated derivatives of such materials; and the like, frequently tend to promote foaming in conventional mineral base hydrocarbon oils.

According to the present invention, oils containing additives of the above types or mixtures of such additives are treated with .001 to 1.00, e.g. 0.01 to 0.20 weight percent of dimethyl silicone and about 0.01 to 8.0, e.g. 0.5 to 5.0 weight percent of an ether material, said weight percentages being based on the weight of dry detergent additive dissolved in the oil. This treatment may be carried out by simply mixing the silicone and ether material into the oil composition. Since additives are frequently handled in concentrated form before blending to make the final oil composition, it is generally more convenient in actual practice to treat the additive concentrate than the final composition.

The composition and method of the present invention are particularly effective in reducing the foam-promoting tendencies of metal sulfonates, metal alkyl phenol sulfides, and mixtures thereof. These particular compounds are well known to the art as detergent additives for lubricating oils, particularly mineral lubricating oils. They are generally employed in the form of alkaline earth metal salts (the sulfonates are frequently also employed in the form of alkali metal salts).

These metal sulfonates are oil-soluble salts of high molecular weight sulfonic acids generally produced by the treatment of petroleum oils of the lubricating oil range with fuming sulfuric acid. The sulfonic acids which are employed in the production of lubricating oil additives generally have molecular weights of about 350 to 650. These petroleum sulfonates have been described in numerous patents as, for example, U.S. 2,467,176. The sulfonates can also be prepared from relatively pure sulfonic acids having from about 10 to 33 carbon atoms per molecule. For example, sulfonated products of alkylated aromatics such as benzene, toluene, xylene, etc., alkylated with olefins or olefin polymers of the type of polypropylene, polyisobutylene, etc. can be used. Specific examples of such sulfonates include: calcium petroleum sulfonate, barium petroleum sulfonate, sodium petroleum sulfonate, calcium $C_8$ alkyl benzene sulfonate, barium $C_9$ alkyl benzene sulfonate, sodium $C_{16}$ alkyl benzene sulfonate, etc.

The metal alkyl phenol sulfides and polymers thereof used as oil additives and their preparation are well known to the art and have been described in numerous patents, for example, U.S. 2,451,345 and U.S. 2,362,289. These materials have the general formula:

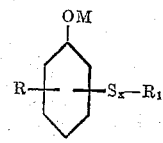

wherein M represents a metal such as aluminum, cobalt, chromium, sodium, lead, etc. or an alkaline earth metal such as calcium, barium, strontium or magnesium, (in the case of polyvalent metals, the other valences may be joined to other inorganic or organic groups or to another alkyl phenol sulfide group), R is generally an alkyl group of 5 to 20, e.g. 8 to 10 carbon atoms, R' is an aryl, alkyl, aralkyl, alkyl-aryl, etc., or another alkyl phenol sulfide group while $x$ is about 1 to 5. Specific examples of these materials include barium tertiary octyl phenol sulfide, calcium tertiary octyl phenol sulfide, barium-calcium tertiary octyl phenol sulfide, barium-tertiary amyl phenol sulfide, calcium tertiary amyl phenol sulfide and barium nonyl phenol sulfide. Additive mixtures of the above metal alkyl phenol sulfides with metal sulfonates in any proportions may be used, e.g. about 50 to 90 wt. percent of phenate sulfide and 10 to 50% by weight of the metal sulfonate.

Silicones which may be used have the general formula:

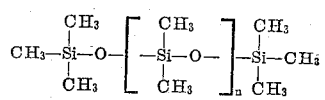

wherein $n$ is a number of about 0 to 100,000, e.g. 100 to 900. These dimethyl silicone polymers will generally have viscosities of 0.65 to 60,000 cs., e.g. 100 to 12,500 cs. at 25° C. depending upon the molecular weight. Other silicone polymers having longer alkyl groups or aryl groups in the molecule are not as effective in the compositions of the invention as the dimethyl silicone polymer.

The ether materials which may be used have the general formula:

$$R(OR')_nOH$$

wherein R is a hydrocarbon group containing 1 to 13, e.g. 1 to 7 carbon atoms and includes aliphatic hydrocarbon groups, aryl, and alkyl substituted aryl groups. The aliphatic hydrocarbon groups may be straight or branched chain, saturated (i.e. alkyl) or unsaturated. R' is a saturated, straight or branched chain aliphatic hydrocarbon group of 2 to 5 carbon atoms, such as ethylene, n-propylene, isopropylene and isoamylene radicals and n is an integer of from 1 to 10, e.g. 1 to 5. Such materials will include ethers of glycols and ethers of polyglycols, such as ethylene glycol monoethyl ether, diethylene glycol monoethyl ether, tripropylene glycol monopropyl ether, diethylene glycol monobenzyl ether, diethylene glycol monobutyl ether, ethylene glycol monobenzyl ether, triethylene glycol monomethyl ether, hexaethylene glycol monoethyl ether and iso-butylene glycol monodecyl ether.

EXAMPLE I

A series of tests were conducted using a base oil composition containing 8.9 weight percent of an additive concentrate and 91.1 weight percent of a mineral lubricating oil (SAE 50 grade). The additive concentrate consisted of (1) about 65% by weight of a mineral oil (lubricating viscosity) solution containing as the active ingredient about 35% by weight of a barium nonyl phenol sulfide having a sulfur to barium ratio (wt. basis) of about 0.37 and wherein the nonyl group is derived from tripropylene and (2) about 35% by weight of a mineral oil (lubricating viscosity) solution containing as the active ingredient about 35% by weight of calcium synthetic sulfonate made from sulfonation of alkylated benzene. This calcium sulfonate had a molecular weight ranging from 780 to 1120 and had an average molecular weight of about 912. A sample of the above base composition was treated with a dimethyl silicone; another sample was treated with diethylene glycol monoethyl ether; and a third sample was treated with both the silicone and ether material. These various compositions were tested for foam tendency (cc. of foam after 5 minutes aeration) and foam stability (cc. of foam volume after 10 minutes' settling), according to the A.S.T.M. foam test, D–892–46T. The results of these tests are summarized in the following table wherein "FT" stands for foaming tendency and "FS" for foam stability.

Table I

| Amount of Foam Inhibitor (Based on Weight of Dry Detergent Additive) | FT, cubic centimeter | FS, cubic centimeter |
| --- | --- | --- |
| None | 610 | 540 |
| 2.86 wt. percent diethylene glycol monoethyl ether | 610 | 510 |
| 5.72 wt. percent diethylene glycol monoethyl ether | 650 | 590 |
| 0.029 wt. percent dimethyl silicone[1] | 460 | 380 |
| 0.058 wt. percent dimethyl silicone[1] | 620 | 490 |
| 2.86 wt. percent diethylene glycol monoethyl ether and 0.029 wt percent dimethyl silicone | 40 | 0 |

[1] Dow Corning 200 Fluid, 350 cs. at 25° C.

As seen from the above data, using either the ether or silicone alone had little effect in decreasing the foaming of the composition. However, when both the ether and silicone were used together the foaming tendency and foam stability were markedly improved.

The invention is further illustrated by the following example.

EXAMPLE II

This example was carried out in the same manner as Example I except for the different materials and as noted in the following table. The amounts used of the silicone and supplemental anti-foaming additive are weight percentages based on the weight of dry detergent additive.

Table II

| Supplemental Anti-Foaming Additive added to Base Oil[1] | Silicone Additive[2] added to Base Oil, percent | Foam Test Results | |
| --- | --- | --- | --- |
| | | Initial, FT/FS | 7 Days, FT/FS |
| None | None | 670/580 | |
| 2.9% diethylene glycol monoethyl ether | 0.024 | 60/0 | 90/0 |
| 2.9% polyethylene glycol (400 mol. wt.) | 0.024 | 550/400 | |
| 2.9% isopropyl oleate | 0.024 | 560/400 | |

[1] Base oil was the same type as used in Example 1, but of a different batch.
[2] Dow Corning Fluid 200, a dimethyl silicone polymer having a viscosity of 100 cs. at 25° C.

As seen from the above table, the combination of the invention, i.e. the diethylene glycol monoethyl ether and dimethyl silicone effectively reduced the foaming of the detergent-containing oil composition, even after 7 days' storage. The polyethylene glycol-400 and the isopropyl oleate had no significant effect. Lower molecular weight glycols such as ethylene glycol and diethylene glycol are effective in reducing foaming but their use is not favored in crankcase oils, since their presence has been known to cause additive precipitation during actual use in automobile engines.

While the above examples show the treatment of an oil composition containing both sulfonate and phenate sulfide additives, compositions containing only one of these additives can also be effectively treated. For example, a mineral lubricating oil solution consisting of 90 wt. percent of mineral lubricating oil (SAE 30 grade) and 10 wt. percent of a phenate sulfide of the structure:

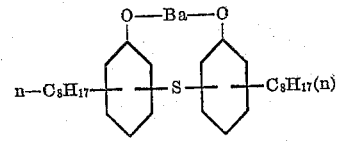

can be mixed with 0.10 part by weight of dimethyl silicone having a viscosity of 1000 cs. at 25° C. and 5 parts by weight of diethylene glycol monobenzyl ether to reduce the foaming tendency of the composition. As another example, a sulfonate concentrate consisting of 70 wt. percent of mineral lubricating oil (SAE 30 grade) and 30 wt. percent of a sodium petroleum sulfonate having an average molecular weight of 450 may be mixed with 0.01 part by weight of a dimethyl silicone polymer having a viscosity of 1000 cs. at 25° C. and 1 part by weight of isobutylene glycol monomethyl ether.

What is claimed is:

1. A mineral lubricating oil containing an oil-soluble detergent additive mixture of a metal sulfonate and a metal alkyl phenol sulfide, from 0.01 to 0.2 weight percent of dimethyl silicone having a viscosity in the range of 100 to 12,500 cs. at 25° C., and from 0.5 to 5 weight percent of diethylene glycol monoethyl ether, said weight percentages being based on the weight of dry detergent additive.

2. A composition according to claim 1 wherein the metal component of said detergent additive is an alkaline earth metal.

References Cited in the file of this patent

UNITED STATES PATENTS 2,430,858   Borsoff et al. ———————— Nov. 18, 1947

FOREIGN PATENTS 666,239   Great Britain ———————— Feb. 6, 1952

OTHER REFERENCES

"Petroleum Refining with Chemicals," by Kalichevsky-Kobe, 1956, Elsevier Pub. Co., page 649.